United States Patent [19]

Yamaguchi et al.

[11] Patent Number: 5,239,904
[45] Date of Patent: Aug. 31, 1993

[54] PUNCH

[75] Inventors: Morio Yamaguchi, Funabashi; Takashi Uchida, Tokyo, both of Japan

[73] Assignee: Max Co., Ltd., Tokyo, Japan

[21] Appl. No.: 739,538

[22] Filed: Aug. 2, 1991

[30] Foreign Application Priority Data

Aug. 8, 1990 [JP] Japan .................... 2-209688
Aug. 9, 1990 [JP] Japan .................... 2-211395

[51] Int. Cl.$^5$ .............................. B26D 5/20
[52] U.S. Cl. ........................ 83/210; 83/684; 83/575; 83/261; 83/372
[58] Field of Search ............. 83/209, 210, 684, 261, 83/575, 370, 372, 588, 208; 310/328

[56] References Cited

U.S. PATENT DOCUMENTS

| | | | |
|---|---|---|---|
| 3,198,114 | 8/1965 | Gomersal et al. | |
| 3,293,973 | 12/1966 | Gerber et al. | 83/573 |
| 3,724,309 | 4/1973 | Takenaka | |
| 3,902,389 | 9/1975 | Brown et al. | 83/588 |
| 4,019,732 | 4/1977 | Hunt, Jr. et al. | |
| 4,175,457 | 11/1979 | Jacobs et al. | 83/261 |
| 4,478,121 | 10/1984 | Ritter et al. | 83/209 |
| 4,570,095 | 2/1986 | Uchikawa | 310/328 |
| 4,579,029 | 8/1984 | Sunaga | 83/364 |
| 4,660,449 | 4/1987 | LeTarte | 83/261 |
| 4,783,610 | 11/1988 | Asano | 310/328 |
| 4,808,874 | 2/1989 | Stahlhuth | 310/328 |
| 4,833,958 | 12/1987 | Abildgaard et al. | 83/154 |
| 4,860,619 | 8/1989 | Yunoki | 83/261 |

FOREIGN PATENT DOCUMENTS 63-121862  5/1988 Japan .
671187     8/1989 Switzerland .

OTHER PUBLICATIONS

"Ceramic Green Sheet Puncher Using Multilayer Piezoelectric Actuator", Yoshida et al., 1987.
"Piezoelectric Impact Printhead Utilizing Longitudinal Piezoelectric Effect", Yano et al., 1989.

Primary Examiner—Frank T. Yost
Assistant Examiner—Allan M. Schrock
Attorney, Agent, or Firm—Jones, Tullar & Cooper

[57] ABSTRACT

A punch is disclosed, which can be used with an automatic paper feeder or a plane paper copier for receiving sheet-like members one by one from such machine and forming punched holes in each sheet-like member at a punching position thereof. A punching member is disposed in correspondence to the punching position for effecting punching with a predetermined stroke. A dimensional strain generated in an electrical-to-mechanical conversion element such as a piezoelectric element or a magnetostriction element is transmitted after enlargement by an enlarging member disposed to surround the element through a movable output terminal and an operation transmission lever to the punching member to cause high speed operation thereof in a predetermined stroke range. High quality punched holes free from curved edges or the like difficiency thus can be formed even in a continuous feed state without holding the sheet-like members stationary for a while.

7 Claims, 11 Drawing Sheets

PUNCH

FIELD OF THE INVENTION

This invention relates to a punch, which receives sheet-like members such as cards and paper sheets (hereinafter referred to as sheets) one by one and punches out filing holes on each sheet at desired positions thereof. More specifically, the invention concerns a punch which is suitable for use with an automatic paper feeder(APF) or plane paper copier (PPC).

BACKGROUND OF THE INVENTION

Usually, sheets such as copying paper sheets are formed with punched holes for filing by means of a manual or motordriven punch by setting one sheet or a plurality of stacked sheets at a predetermined position. The setting of a sheet or sheets at the predetermined position is made using a positioning guide provided on the punch or with a center mark as a guide. The positioning guide is adjusted to meet the sheet size or distance of the sheet edge from the punched holes.

Meanwhile, with recent widespread use and increase in efficiency of business machines such as plane paper copiers (PPC) or automatic paper feeders (APF) for processing sheets, there is a demand for quickly and efficiently performing the punching to form filing holes after a copying process. Japanese Patent Disclosure No. 63-121862 discloses a punch which is intended to meet the demand noted above. This punch is provided on the paper discharge side of the copier, and its punching member is operated against each of the copying sheets, which are discharged one by one by a discharging roller after a copying process, in a timed relation to the discharging of paper by a cam associated with the discharging roller, thus forming punched holes.

When punching a plurality of sheets at a time with a conventional manual or motor-driven punch, it is necessary to stack the sheets in alignment by accurately positioning them. Unless this is done, undesired departure from alignment results when the sheets are filed. In addition, if a large number of sheets are punched at a time, edge curve or burrs are formed around the punched holes. This does not present any problem when filing the punched sheets. However, when these sheets are loaded in a copier with an automatic paper feeder (APF) for copying again on these sheets, the curved edge or burrs noted above have adverse effects on smooth feeding of the sheets.

A merit of the structure disclosed in the aforementioned Japanese Patent Disclosure No. 63-121862 is that sheets after a copying process are subjected to one-by-one punching before being discharged onto a copy tray. This precludes the cumbersomeness of handling sheets in the case of punching a plurality of sheets at a time, and thus cope with the recent business processing efficiency increase. With the disclosed structure the punching member effects punching to form punched holes in sheets which are fed continuously with its vertical movement stroke provided by a cam action in association with the operation of the discharging roller.

Therefore, if the paper feed speed is too high, it can not be followed by the punching speed of vertical movement of the punching member caused by the cam function. This means that a limitation is imposed on the copying process speed increase on the copier side. Moreover, the relation between the timing when the punching member is brought into contact with paper at the time of punching and paper feed speed is liable to cause catching of the punching member on the punched hole edge, and this is undesirable for punched hole formation quality improvement.

As a measure to solve the above problem in the above prior art punch utilizing the cam action that it is difficult to form neat punched holes, the invention contemplates stopping sheets being fed temporarily at a punching position and cause punching operation of the punching member while the sheets are stationary. To have sheets stopped temporarily, positioning means to this end is necessary. The invention utilizes such positioning means of sheet feed position determination structures which are used in conventional time recorders, copiers and other business machines for dealing with sheets such as cards and printing or copying sheets.

As a sheet feed position determination structure in the other business machines noted above, there is a well-known structure, in which a sheet is pinched between a drive roller and a pinch roller to be fed and held stationary for a while by starting and stopping the drive roller with a stepping motor, a servo motor or a DC motor.

FIG. 16 shows a structure which uses a stepping motor. In this structure, a sheet-like member (a) such as a printing or copying sheet is pinched between a drive roller (c), which is driven by a stepping motor (b) as a drive motor, and a pinch roller (d) opposing the drive roller, and can be fed along a guide member (e) in the direction of arrow A in the Figure. A sensor (g) detects a reference position of the sheet-like member (a), for instance the leading end (f) thereof, and supplies a pulse corresponding to the distance from the reference position to a predetermined feed position to the stepping motor (b) through a control circuit (h). According to this pulse, the stepping motor (b) is driven to rotate the drive roller (c) and then stops it, thus stopping the sheet-like member (a) at the feed position noted above to effect feed positioning of the sheet-like member (a).

The pinch roller (d) is rotatably supported by a free end of an arm member (i) pivoted at the other end, and a spring member (j) biases the arm member (i) to urge the fed member (a) against the drive roller (c).

Designated at (k) in the Figure is a belt for transmitting the rotation of the stepping motor (b) to the drive roller (c).

FIG. 17 shows a structure using a servo motor. In the Figure, parts like those in FIG. 16 are designated by like reference symbols. In this structure, in addition to the sensor (g) an encoder (m) is provided to detect the amount of rotation of a servo motor (l) as a drive motor for detecting the feed position of the sheet-like member (a). The output of detection is fed back through the control circuit (n) to the servo motor (l) to control the servo motor (l) for determining the feed position of the sheet-like member (a).

In a structure using a DC motor, a sensor is provided at the stop position of the sheet-like member, and according to the detection of the sheet-like member by the sensor the DC motor is stopped to determine the feed position of the sheet-like member.

In the above prior art positioners for positioning sheet-like members such as cards and printing or copying sheets, however, the stepping motor or servo motor employed is expensive. Moreover, where the stepping motor is used, such complicated control as commonly termed trapezoidal control is necessary for causing gradual start and stop of the motor in order to prevent overshoot or the like. Also, where the servo motor is used, an encoder, a feedback circuit, etc. are necessary, leading to a complicated structure and circuit.

The structure using the DC motor is not so expensive. However, in order to stop the motor quickly at the time of position detection by the sensor, it is necessary to slow down the motor right before the stop position and also cause generation of a sudden electric braking force in the motor at the stop position. Therefore, the control circuit is again complicated, leading to high cost.

In either case, complicated motor control is necessary in order to prevent inertial rotation of the motor when stopping the motor to stop the sheet-like member pinched between the drive roller and pinch roller at a predetermined position.

As discussed above, the stepping motor, servo motor and DC motor can of course be used as a drive source for feeding the sheet-like member, and a structure of a mechanism for determining a punching position or like predetermined position with these motors or with a combination of these motors and a simple sensor can be sufficiently adopted. However, as seen in the other business machines noted before, a system using such motors for stopping a sheet-like member or the like in a predetermined position is complicated in its mechanical structure and control circuit structure as described. Therefore, a new mechanism for determining a feeding position is expected having a simpler structure and more reliable stop control.

SUMMARY OF THE INVENTION

The present invention seeks to solve the above various problems inherent in the prior art structures, and one of its object is to provide a punch, which permits formation of punched holes quickly and accurately in a sheet such as a copying sheet at desired positions thereof and can sufficiently cope with the operating speed increase of automatic paper feeders (APF) and plane paper copiers (PPC) in its use with these machines.

Another object of the present invention is to provide a punch provided with a positioner, which can effect ready and quick positioning of a sheet-like member with a simple structure and without the need of any complicated structure or control circuit as a structure for holding the sheet-like member for a while when performing the punching operation.

To attain the above objects of the present invention, there is provided a punch, which has a structure for receiving sheet-like members one by one and forming punched holes in each sheet-like member at a predetermined punching position thereof and comprises feeding means for feeding each received -sheet-like member along a feed path, position determination means for determining the predetermined punching position, at which each sheet-like member fed by the feeding means is punched, a punching member opposing the predetermined punching position and capable of executing a punching operation with a predetermined stroke to form punched holes in the sheet-like member at the punching position thereof, first electrical-to-mechanical conversion element means for generating a predetermined amount of dimensional strain, and first enlargement means for enlarging the dimensional strain generated in the first electrical-to-mechanical conversion element means and transmitting the enlarged dimensional strain to the punching member, thereby causing execution of the punching operation of the punching member with the predetermined stroke.

A punch having the above construction according to the present invention features that the electrical-to-mechanical conversion element is used as a drive source for operating the punching member, and that a dimensional strain of the element produced with a piezoelectric effect is transmitted after enlargement by enlargement means to the punching member. With this structure, the response speed of operating the punching member, i.e., the time from the instant of determination of the predetermined punching position by the position determination means until the operation of the punching member and also the restoration time after completion of the punching, is greatly increased compared to the case of a mechanical drive source using a cam or the like or the case of an electromagnetic drive source using a solenoid. Thus, the punch can sufficiently perform punching in cases where sheets are fed continuously, and it can sufficiently permit the processing speed of such sheet processing apparatus as the APF or PPC to be used with it. Particularly, it can cope without any problem with the case of forming a plurality of punched holes continuously in a sheet-like member in a sheet feed direction.

Further, since an enlargement mechanism is used as an enlargement means to enlarge the dimensional strain of the electrical-to-mechanical conversion element before transmission to the punching member, it is possible to use an element which is small in size and inexpensive. Further, even where the punching member punches continuously fed sheets with each sheet held stationary for a while at the predetermined punching position by the position determination means, the punch can sufficiently cope with the processing speed of such sheet processing machines as the APF or PPC because of the high response speed of the punching member, while the punching operation is performed with the sheet substantially in the stationary state, thus reliably preventing such disadvantages as catching of the punching member on the punched hole edge and the resultant formation of curved edges and permitting formation of more accurate and beautiful punched holes.

As a preferred specific structure of the punch according to the present invention, an enlarging mechanism constituting the enlargement means includes an enlarging element having a pair of mounting parts disposed in correspondence to the opposite ends of the piezoelectric element in the longitudinal direction thereof, a set of links hinged to the mounting parts and also to one another, a stationary output terminal or end coupled to the set of links on one side of a longitudinal axis of the piezoelectric element, and a movable output terminal or end coupled to the set of links on the side of the piezoelectric element opposite the stationary terminal such as to provide a dimensional strain of the piezoelectric element after enlargement through the pair of mounting parts and set of links, and the enlargement means further includes an operation transmission lever operatively coupled to the punching member and also to the movable output terminal such as to transmit a movement of the movable terminal to the punching member and thereby produce the predetermined stroke of the punching member.

The enlarging mechanism having the above construction can be compact and readily permit small size design of the punch itself. Moreover, the operation transmission lever permits further enlargement of the dimensional strain of the piezoelectric element to ensure a sufficient stroke of the punching member while permitting simplification of the lever structure.

Further, in a preferred punch structure according to the present invention, in which the sheet-like member to be punched is held stationary for a while at the punching position, the feeding means includes a feed roller mechanism, which can be shifted between an operative position to feed the sheet-like member in a pinched state with a predetermined feeding force and an inoperative position to provide substantially no feeding force to the sheet-like member, and the position determination means includes detection means for detecting the feed position of the sheet-like member in the feed path, and a shifting mechanism for temporarily shifting the feed roller mechanism from the operative position to the inoperative position in response to an operation of the detection means to have the sheet-like member released from the feeding force and held stationary for a while at the predetermined punching position.

As a further preferred structure of the punch, the shifting mechanism includes an electrical-to-mechanical conversion element consisting of a piezoelectric element or a magnetostriction element for generating a predetermined amount of dimensional strain in response to an operation of the detection means and an enlarging mechanism operatively coupled to the feed roller mechanism for enlarging the dimensional strain of the electrical-to-mechanical conversion element and transmitting the enlarged dimensional striction to the feed roller mechanism to shift the feed roller mechanism from the operative position to the inoperative position.

With this structure, as the feed roller mechanism is temporarily shifted to the inoperative position by the shifting mechanism, the feeding force exerted on the sheet-like member vanishes, and thus the sheet-like member is stopped. Thus, even where the drive motor is a continuously driven motor such as a DC motor, the stopping of the motor and associated inertial rotation thereof have no adverse effects. Moreover, no complicated structure or control circuit is necessary for feeding or stopping the sheet-like member, and satisfactory positioning of the sheet-like member can be readily obtained with a simple structure.

Further, with the above structure of the shifting mechanism, in which a dimensional strain of a piezoelectric element or a magnetostriction element is utilized and provided with by enlarging it through the enlarging mechanism to effect shifting of the feed roller mechanism, punching is possible with the sheet-like member held stationary for a shorter period of time, and higher quality punching operation is possible. Furthermore, the punch can sufficiently cope with the sheet feed speed of the APF or PPC used with it.

The above and further objects, features and advantages of the invention will become more apparent from the following description of the preferred embodiments with reference to the accompanying drawings.

DESCRIPTION OF THE PREFERRED EMBODIMENTS

Figure 1:
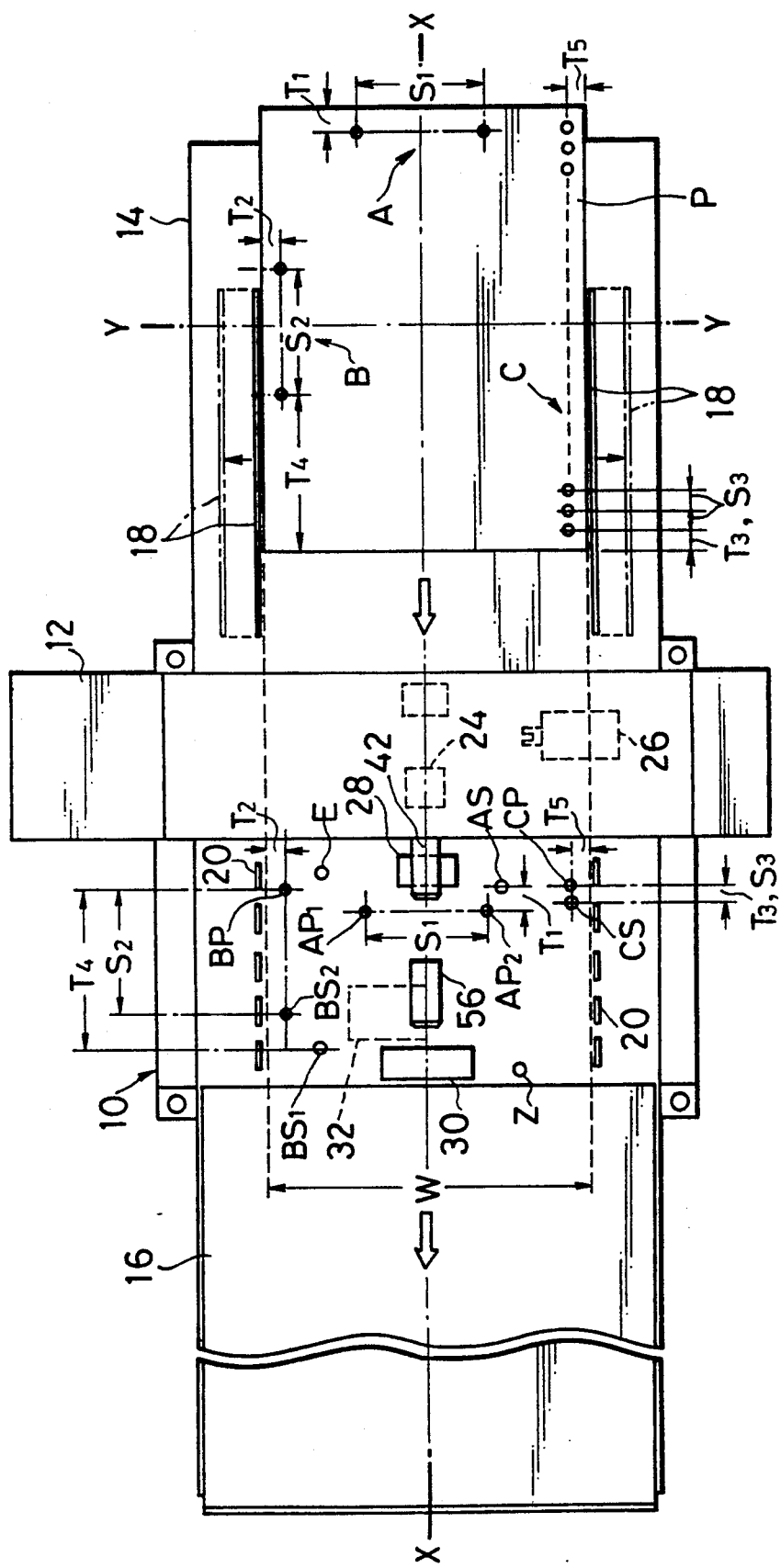
FIG. 1 is a schematic plan view used for explaining the operations of feed position detection and punching of sheet-like members in a punching system employing a first embodiment of the punch according to the present invention connected to an APF.

FIG. 1 shows a status, in which a paper sheet P cut to a predetermined size is fed as shown by arrows and punched at its predetermined position with the punch according to the present invention connected to an automatic paper feeder (hereinafter referred to as APF).

Referring to the Figure, designated at 10 is a punch according to the present invention, at 12 is the APF connected to the punch 10. A sheet supply cassette 14 for supplying sheets P to the APF, and a sheet discharge tray 16 are also shown.

The sheets P are fed, one by one, longitudinally in a state guided by a pair of sheet guides 18 in a feed direction shown by the arrow along the center line X—X to the APF 12. These sheets P are automatically fed successively by the APF 12 to the punch 10 to be punched and then discharged onto the discharge tray 16.

In this embodiment, the APF 12 is connected to the punch 10 as a sheet feeding unit to feed sheets to the punch 10. However, it is possible to connect a plane paper copier (hereinafter referred to as PPC) in lieu of the APF 12 while disposing the punch 10 on the discharge side of the PPC.

This embodiment has a structure, in which two different kinds of cut sheets can be loaded in a cassette 14, that is, sheet P of the illustrated size, guided by sheet guides 18 at the positions shown by the solid lines, and a sheet (not shown) of a greater size, guided by the sheet guides 18 at more spaced-apart positions as shown by phantom lines, can both be handled. The sheet guides 18 may be of a well-known structure capable of slidable adjustment to meet the width dimension of the sheet.

The sheet P is formed with punched holes of different types, depending on the filing fashion. Usually conceived filing types are a transversal two-hole type (A), a longitudinal two-hole type (B) and a longitudinal multiple-hole type (C). In the cases of the type (A) and (B), the distances S1 and S2 between the two holes and the distances T1 and T2 of the hole center from the sheet edge are standardized, and it is also standardized that the two holes are at symmetrical positions with respect to the transversal or longitudinal center line X—X or Y—Y of the sheet. Further, in the case of the longitudinal multiple-hole type (C) usually the number of holes is substantially standardized although it varies slightly depending on the filing system, the inter-hole distance S3 is uniform, and the distance T3 of the end hole from the sheet edge is almost the same as the inter-hole distance.

The punch according to the present invention permits punching to meet the above standardized punching pattern specifications. To this end, the punch 10 is provided with a sheet entry sensor E for detecting the entry of a sheet P, a sheet discharge sensor Z for detecting the discharge of the sheet and sensors having functions of position determination means, i.e., sensor AS for type (A), sensors BS1 and BS2 for type (B) and sensor CS for type (C).

Further, the punch 10 has a pair of auxiliary guides 20 which provide restrictions on sheet P in the width direction thereof. As described later, these auxiliary guides 20 are comb-like in shape and can selectively set the feed path of sheet P.

Punching positions AP1 and AP2 are provided symmetrically with respect to the center line X—X. Their distance from each other is equal to the distance S1 between the two type (A) holes, and the distance between each of the punching positions and sensor AS is set equal to the distance T1. Further, the distance between the punching position BP and the associated auxiliary guide 20 is set equal to type (B) T2, the distance between the punching position BP and the sensor BS1 is set equal to the distance of the type (B) end hole from the front edge of the sheet P, and the distance between the punching position BP and the sensor BS2 is set equal to the distance S2 between the two type (B) holes. Further, the distance between the punching position CP and the sensor CS is set equal to the type (C) distance T3, S3, and the distance between the punching position CP and the other one of the auxiliary guides 20 is set equal to the distance of each type (C) hole from the side edge of sheet P.

The sensors used in this embodiment serve to detect the edge of sheet P or the punched holes. In one example of their structure, a sensor lever is provided on sheet feed path 22 (FIG. 2), and an optical sensor such as a photointerrupter provides a necessary timing signal upon detection of a slight movement corresponding to the passage of a sheet due to a departure from flatness at the punched hole positions. The sensors may be of either a contact type or a reflection type.

As will be described later, a punch unit constituting punching means is disposed at each punching position to execute a punching operation according to a sensor signal.

The mounting positions of the sensors and punching units may be adjusted to set more accurate punching positions.

Figure 2:
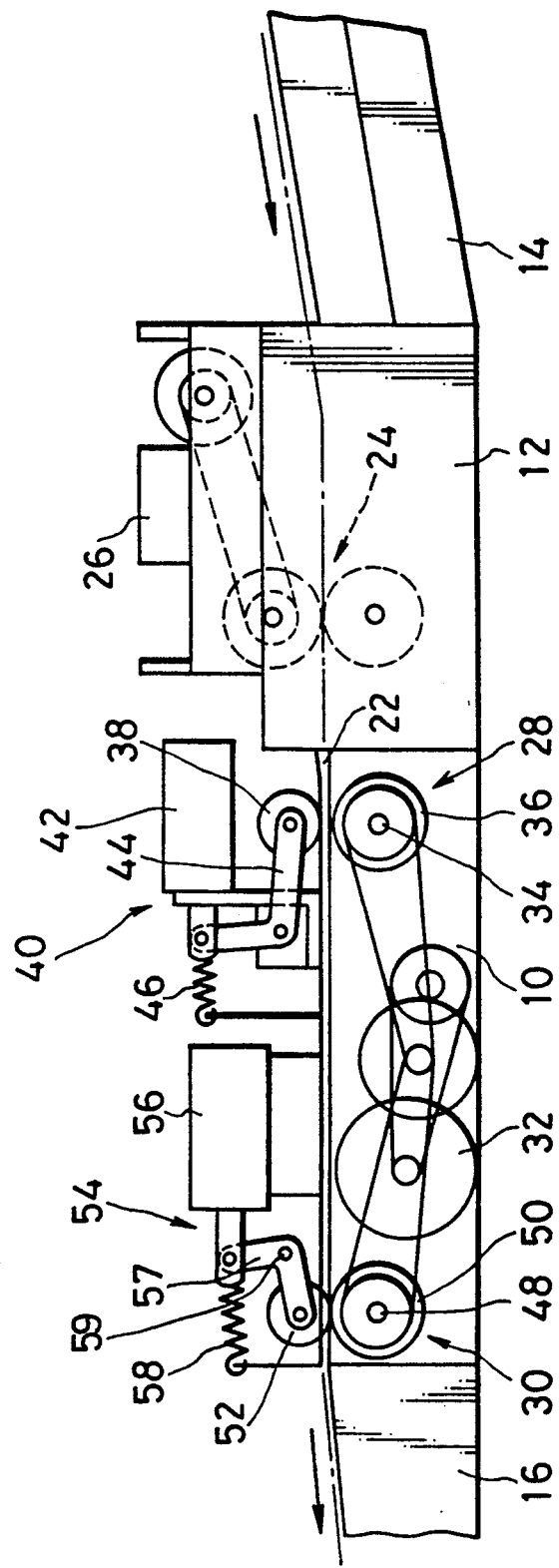
FIG. 2 is a fragmentary enlarged-scale side view showing the feeding status of sheet-like members in the punching system shown in FIG. 1.
Figure 3:
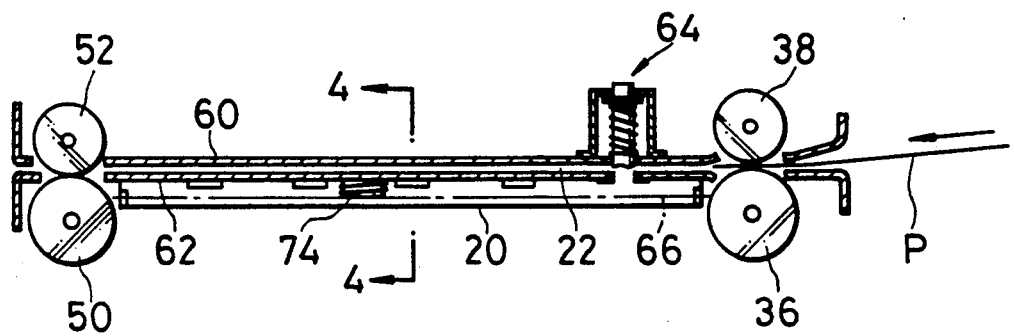
FIG. 3 is a fragmentary enlarged-scale sectional view, showing along a sheet feed direction a part of the punch shown in FIG. 1, including a sheet feeder unit, a punch unit and a movable sheet guide.

Referring to FIGS. 1 to 3, for feeding sheet P a feed roller mechanism 24 and a solenoid 26 for controlling the timing of driving of the mechanism are provided in the APF 12. These elements are driven according to a feed cycle start signal to feed sheet P into the sheet feed path 22 of the punch 10. The APF 12 may be of a well-known structure.

As feeding means for feeding sheet P in the punch 10, a feeding system is provided, which includes a first feed roller mechanism 28 disposed on the sheet entry side, a second feed roller mechanism 30 disposed on the sheet discharge side, and a drive motor 32 for supplying drive power to these mechanisms via pulleys and belts. The first feed roller mechanism 28 has a drive roller 36 rotatable about a stationary shaft 34 and a driven roller 38 opposing the drive roller via the feed path 22. The roller 38 is coupled to a first shifting mechanism 40 for determining a temporary stop position of the sheet. The mechanism 40 has a solenoid 42 constituting a drive source, an operating lever 44 coupling the solenoid 42 and roller 38 to each other and a spring 46 for normally holding the roller 38 at an open position spaced apart from the drive roller 36 as shown in FIGS. 2 and 3.

The second feed roller mechanism 30 has a drive roller 50 rotatable about a stationary shaft 48 and a driven roller 52 opposing the drive roller via the feed path 22. The roller 52 is coupled to a second shifting mechanism 54 for determining a temporary stop position of the sheet P. The mechanism 54 has a solenoid 56 constituting a drive source, an operating lever 57 coupling the solenoid and roller 52 and rotatable about a stationary pivotal shaft 59 and a spring 58 for normally holding the roller 52 at an operative position urged against the drive roller 50 as shown in FIGS. 2 and 3.

The first and second shifting mechanisms 40 and 54 constitute position determination means together with the sensors AS, BS1, BS2 and CS noted before, The sheet feed path 22 is defined by a pair of, i.e., upper and lower, parallel guide plates 60 and 62, which are spaced apart by an amount sufficient to permit smooth passage of sheet P. The first and second shifting mechanisms 40 and 54 are provided on the plate 60, and driving side portions of the first and second feed roller mechanisms 28 and 30 are provided on the underside of the other plate 62.

As shown in FIG. 3 and also in FIG. 6 to be described later, a punch unit 64 is disposed on the upper guide plate 60, and the auxiliary guide 20 noted before is movably supported by the lower guide plate 62.

Figure 4:
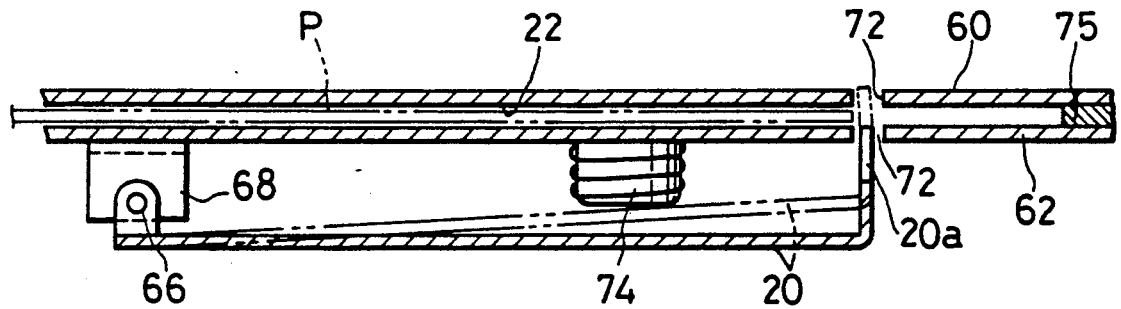
FIG. 4 is a fragmentary enlarged-scale sectional view taken along line 4—4 in FIG. 3 showing, to an enlarged scale, the structure of the movable sheet guide.
Figure 5:
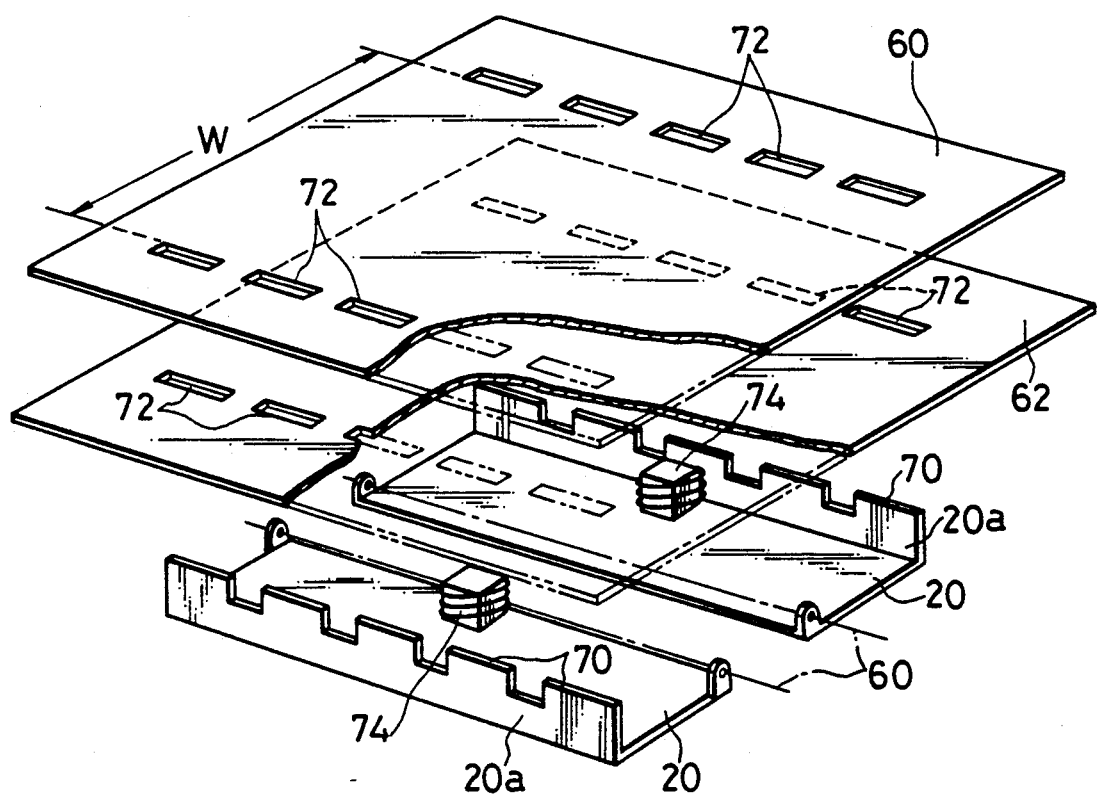
FIG. 5 is an exploded perspective view showing the structural relation of upper and lower guide plates and a movable sheet guide for guiding sheet-like members.

The structural relationship among the auxiliary guide 20 and guide plates 60 and 62 will now be described with reference to FIGS. 3 to 5. The auxiliary guide 20 is provided on each side, and its stem part is mounted by a bracket 68 on guide plate 62 for rotation about a pivot 66 (FIG. 4) extending in the sheet feeding direction. Its free end part has a comb-like guide portion 20a. The upper and lower guide plates 60 and 62 have slits 72 corresponding in position to projecting portions 70 of the comb-like guide portion 20a. The slits 72 are aligned end to end and at a fixed interval in the sheet feed direction. The distance W between the two arrays of slits 72 (FIG. 5) corresponds to the width of sheet P.

With the comb-like structure of the guide portion 20a of each auxiliary guide 20 for engagement in the slits 72 formed in the two guide plates 60 and 62, there is no need of forming any continuously elongate guide slit in the guide plates 60 and 62, and it is possible to avoid the mechanical strength reduction of the guide plates.

Figure 6:
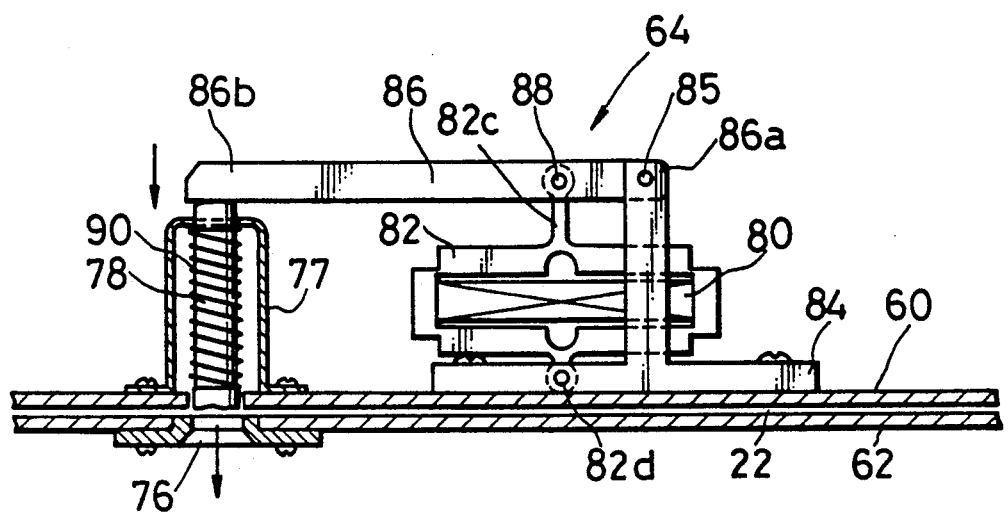
FIG. 6 is a fragmentary enlarged-scale view showing the punching unit.
Figure 7:
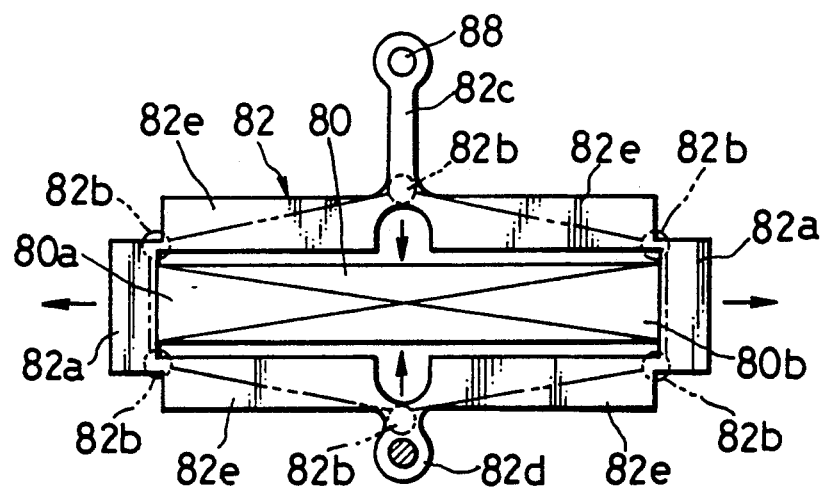
FIG. 7 is a view used for explaining the operational status of a piezoelectric element and an enlarging mechanism in the punch unit shown in FIG. 6.

The punch unit shown in FIGS. 6 and 7 includes a punching member 78 consisting of a punching pawl, which is supported for vertical movement by a support member 77 provided on the plate 60 such that it corresponds to a punching operation hole 76 penetrating the guide plates 60 and 62, a piezoelectric element 80 constituting electrical-to-mechanical conversion element means for generating a dimensional strain with a piezoelectric effect according to an applied voltage, and an enlarging member 82 for transferring the dimensional strain of the piezoelectric element 80 after enlargement to the punching member 78 to cause a punching operation thereof in the direction of the arrow (FIG. 6). The enlarging member 82, as shown in FIG. 7, is a one-piece member made from stainless steel or like metal plate and disposed to surround the piezoelectric element 80. It has a pair of mounting portions 82a mounted on longitudinally opposite ends 80a and 80b of the piezoelectric element 80 and a pair of movable links 82e located on the opposite sides of the piezoelectric element 80 and hinged by hinge portions 82b to the mounting portions 82a and also by hinge portions 82b to output terminals 82c and 82d.

When a dimensional strain based on the piezoelectric effect is generated in the piezoelectric element 80 in the longitudinal direction thereof as shown by the arrows in FIG. 7, it is directly transmitted to the pair of mounting portions 82a to cause a movement thereof away from each other. This movement of the mounting portions 82a causes a movement of the hinge portions 82b corresponding to the output terminals 82c and 82d toward each other with a relation of the hinges 82b and link nodes connecting the hinges as shown by the broken line. This movement is transmitted after enlargement according to the link ratio to the output terminals 82c and 82d, thus causing a movement thereof toward each other as shown by the arrows in FIG. 7. In this embodiment, however, the output terminal 82d is a fixed output terminal secured to a base 84, by which the punch unit 64 is mounted on the guide plate 60. Therefore, the displacements of the two output terminals produced by the dimensional strain of the piezoelectric element 80 are transmitted as their sum to the other output terminal 82c, which is a movable terminal, and thence to operation transmission lever 86. The lever 86 has its distal end 86a pivoted to a stationary pivotal axis 85 on the base 84, while its free end 86b corresponds to the upper end of the punching member 78. Thus, the lever 86 receives a force from the movable output terminal 82c and undergoes rotation in the counterclockwise direction in FIG. 6. According to the lever ratio with respect to the lever 86 between the mounting point 88 of the movable output terminal 82c, the free end 86b operatively connected to the punching member 78 and the distal end 86a, the dimensional strain transmitted from the piezoelectric element 80 to the movable output terminal 82c is further enlarged before being transmitted to the punching member 78, thereby causing the punching operation of the punching member 78 against return spring 90. The lever 86 constitutes together with the enlarging member 82 enlargement means for deriving the dimensional strain of the piezoelectric element 80 after enlargement.

It is to be appreciated that according to the present invention as a drive source for the execution of the punching operation of the punching member 78 is used a commonly termed piezoelectric actuator, which utilizes the dimensional strain of the piezoelectric element 80 based on the piezoelectric effect. Thus, very high speed operation can be obtained compared to a cam action or solenoid driving used in the prior art. Where a solenoid is used, the response speed is of the order of milliseconds, whereas with the piezoelectric actuator a response speed of the order of microseconds can be obtained.

Further, the amount of the dimensional strain of the piezoelectric element is determined by the size thereof. This means that without use of any enlargement means a greater size piezoelectric element is necessary to obtain a necessary punching stroke. In this case, the cost of the punch is increased because the element is expensive. According to the present invention, the dimensional strain of the piezoelectric element is enlarged by the enlargement means before being transmitted to the punching member. Thus, it is possible to use a small size piezoelectric element and provide an inexpensive and small size punch.

Now, a sheet position determination unit will be described, which includes a second feed roller mechanism 30 and the second shifting mechanism 54 cooperating therewith, with reference to FIG. 8.

When solenoid 56 as a drive source of the shifting mechanism 54 is not energized, the driven roller 52 biased by the spring 58 is in its urging position to be urged against the drive roller 50. In this state, a sheet P entering the feed path 22 can be pinched between the two rollers 50 and 52 and fed in this state in the feed direction as shown by the arrow. However, when the position of the sheet P to be punched reaches the punching position, the solenoid 56 is energized momentarily and de-energized after a very short while. With the energization of the solenoid the operating lever 57 is turned in the clockwise direction about the stationary pivotal axis 59 against the force of the spring 58, thus shifting the driven roller 52 to the open or inoperative position as shown by the phantom line and releasing the urging force against the drive roller 50 momentarily. The energization time is set to be short enough for the driven roller 52 to return to the normal urging position very soon. Thus, the sheet P is held stationary momentarily at the punching position and then commences to be fed again after the execution of the punching operation. When the urging of the driven roller 52 against the drive roller 50 is released momentarily, the frictional force between the sheet P and the drive roller 50 becomes very low. Meanwhile, the frictional force applied between the sheet P and the guide plates 60 and 62, i.e., feed resistance, becomes extremely high compared to the frictional force between the sheet P and the drive roller 50. Thus, the feeding force applied to the sheet P vanishes, and the sheet P can be stopped and held stationary for a while. In this way, the punching position of the sheet P is determined by the shifting mechanism 54.

Figure 8:
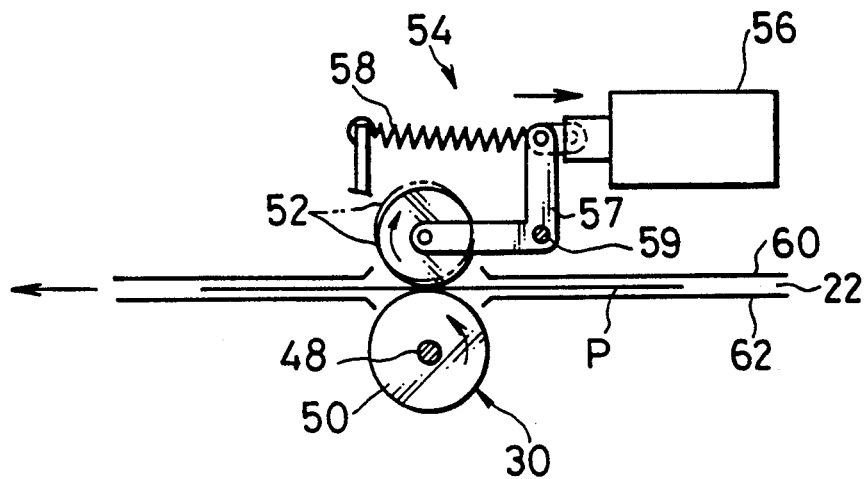
FIG. 8 is a schematic view showing a feed roller mechanism of the sheet feeder unit and a positioning unit having a shifting mechanism using a solenoid.
Figure 9:
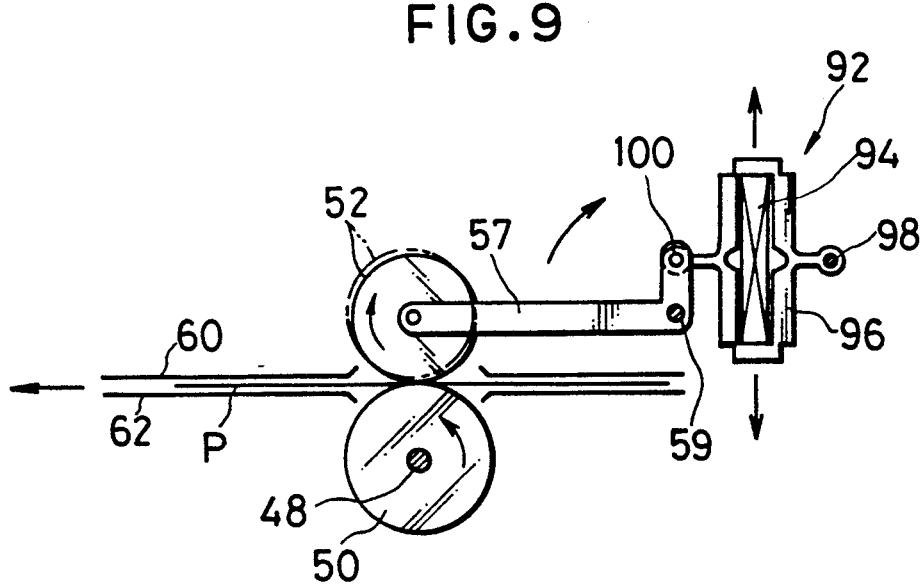
FIG. 9 is a schematic view showing a modification of the positioning unit using a piezoelectric actuator including a piezoelectric element.

FIG. 9 shows a modification of the sheet position determination unit. In this example, a piezoelectric actuator 92 is used in lieu of the solenoid 56 as the drive source of the shifting mechanism 54 shown in FIG. 8. The piezoelectric actuator 92 has the same structure as used for the punching unit 64 shown in FIG. 7. More specifically, it comprises a piezoelectric element 94 and a one-piece enlarging member 96 surrounding the element 94 and having hinges and links. One output terminal 98 of the enlarging member 96 is a stationary output terminal, while the other output terminal 100 is a movable output terminal coupled to one end of the operation transmission lever 57.

When sheet P reaches a predetermined punching position, a voltage is applied momentarily to the piezoelectric element 94. As a result, a dimensional strain, shown by the arrows, is generated in the element 94, and it is enlarged by the enlarging member 96 and further enlarged according to the lever ratio of the operating lever 57, causing a clockwise rotation of the lever 57, as shown by the arrow, to cause the driven roller 52 to be shifted momentarily from the urging position to the released position and be returned to the normal urging position very soon like the case of FIG. 8. Thus, like the case of FIG. 8 the sheet P is positioned at a predetermined punching position. FIGS. 8 and 9 show the guide plates 60 and 62 greatly spaced apart from sheet P. Actually, however, both plates 60 and 62 are disposed so that the sheet P is normally receiving feed resistance from the guide plates 60 and 62.

The above modification of FIG. 9, which uses the piezoelectric actuator 92, can provide higher response speed compared to the structure of FIG. 8 and thus permit higher speed punching.

It is to be understood that the first shifting mechanism 40 may adopt a piezoelectric actuator like that shown in FIG. 9 in lieu of the solenoid 42.

As for the structure of the piezoelectric actuator those shown in FIGS. 7 and 9 are preferred, particularly those, in which the enlarging members 82 and 96 are small and simple in structure. However, these structures are by no means limitative, and other well-known structures may of course be adopted as well.

Further, while in the above embodiment use is made of piezoelectric elements as the drive sources of the punch unit and feed roller mechanism, it is also possible to use as the drive source a magnetostriction element, which is an electrical-to-mechanical conversion element like a piezoelectric element. The magnetostriction element utilizes a magnetic strain phenomenon which can be brought about by setting up a magnetic field linked with a magnetostriction material via a coil, and its response characteristics are far superior to those of the piezoelectric element.

Figure 10:
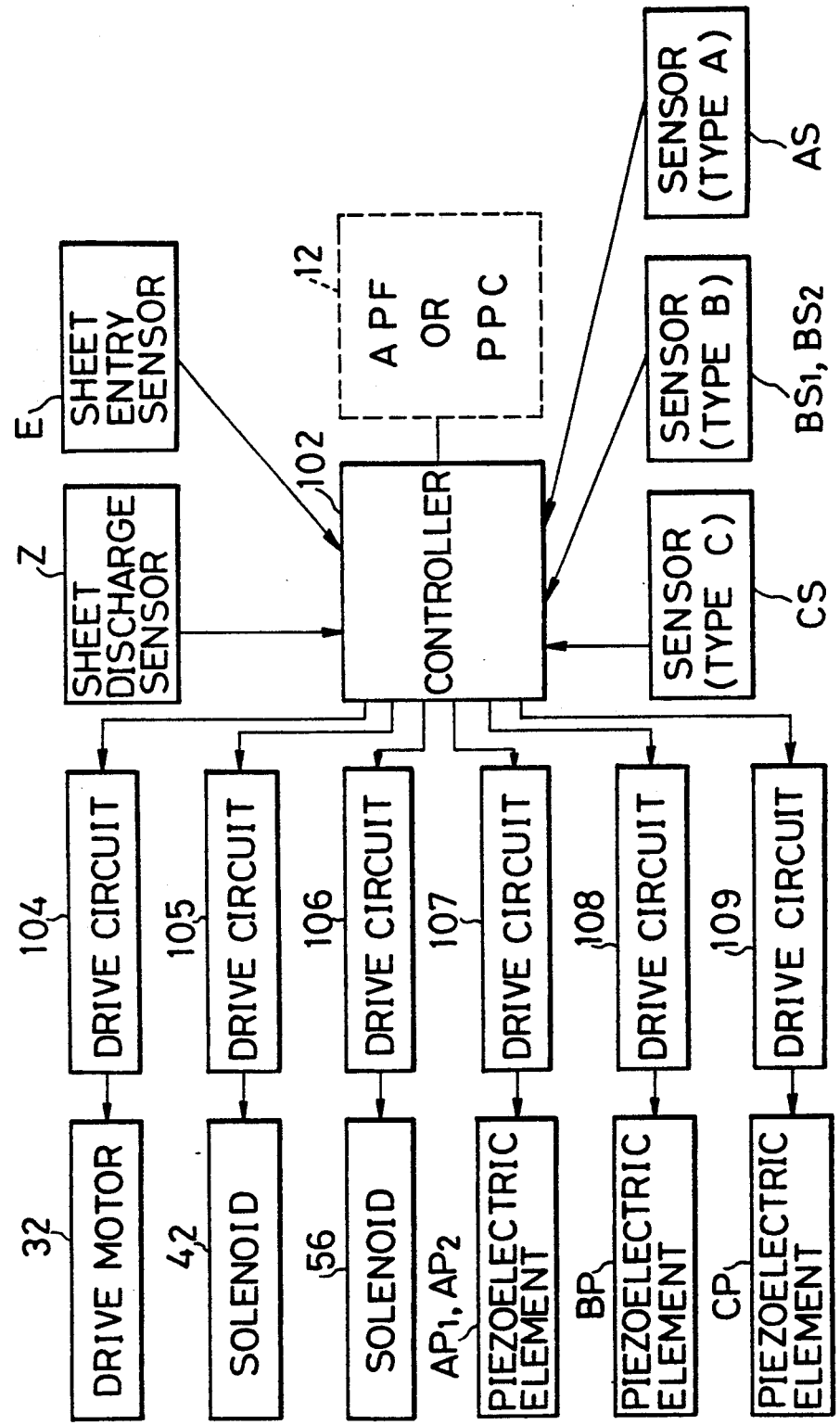
FIG. 10 is a control block diagram relating to punching operation of the punch shown in FIG. 1.
Figure 11:
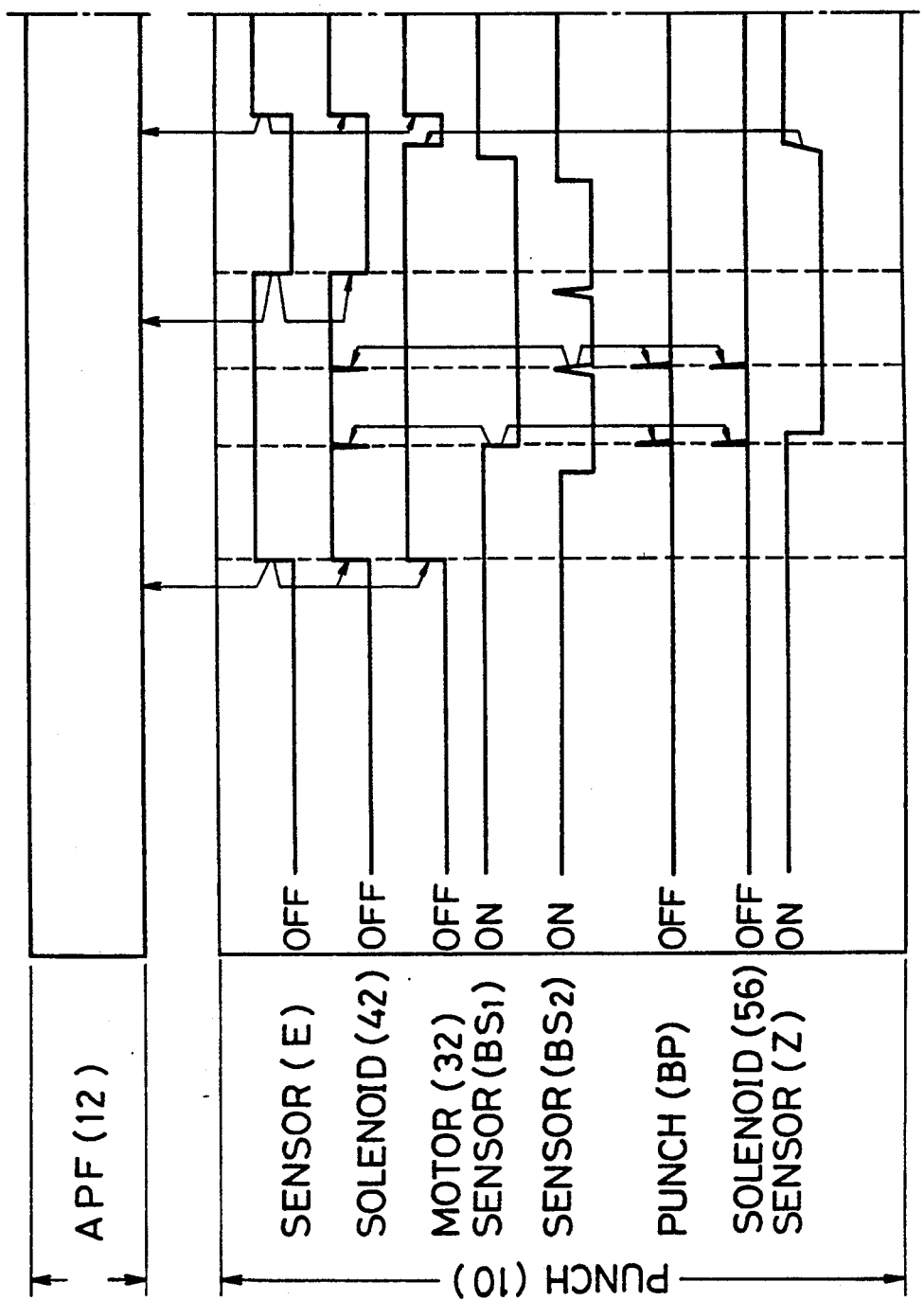
FIG. 11 is a time chart in the case when performing punching of a B type.

Now, a sequence of operations of the punching process on sheet P with the punch according to the present invention will be described with reference to FIGS. 1, 10 and 11.

First, an operation control system of the punch according to the present invention shown in the block diagram of FIG. 10 will be described. In the control system, the sheet entry sensor E, sheet discharge sensor Z and sensors AS, BS1, BS2 and CS for the respective sheet types (A), (B) and (C) are connected to a controller 102 consisting of a CPU for supplying detection signals. For coupling the detection signals from these sensors to various drive sections through the controller 102, a sheet feed drive motor 32, solenoids 42 and 56 of the first and second shifting mechanisms and piezoelectric elements of the punch units disposed at the punching positions AP1, AP2, BP and CP for the types (A), (B) and (C) are connected through drive circuits 104 to 109 to the controller 102. Further, for exchange of signals concerning the sheet feed with the punch according to the present invention, the controller 102 is connected to a sheet feeder 12 such as a APF or a PPC.

A case when subjecting sheet P to the type (A) punching will first be described. When a sheet P is supplied from the APF 12 to the punch 10, the sheet entry sensor E detects the leading end of the sheet and thereupon provides a rising signal through the controller 102 to the APF 12 to stop the sheet feed operation thereof. At the same time, the controller 102 provides a drive signal to the drive circuits 104 and 105 to operate the drive motor 32 and solenoid 42 for further feeding the sheet P in the punch 10. Subsequently, when the trailing end of the sheet P passes by the sensor E, the sensor E provides a falling signal, and the controller 102 provides a driving discontinuation signal to the drive circuit 105. As a result, the driven roller 38 is shifted away from the drive roller 36 to an open or inoperative position, but the sheet P is continually fed by the second feed roller mechanism 30. When the trailing end of the sheet P passes by the sensor AS, the sensor AS provides a detection signal, and with this timing the controller 102 provides a driving signal to the drive circuit 107. As a result, a drive voltage is applied to the piezoelectric element 80 of the punch unit 64 at each of the punching positions AP1 and AP2. Thus, two punched holes are formed simultaneously. In synchronism to this punching operation, the controller 102 provides a driving signal to the drive circuit 106, thus causing operation of the solenoid 56 to shift the driven roller 52 to the open position. The sheet P thus is momentarily positioned at the punching position, and the punching operation is executed with the sheet P held momentarily stationary. Thus, beautiful punched holes are formed without the possibility of formation of curved punched hole edges by the punching member 78, or like deficiency. In this embodiment, the position determination means which determines the arrival of sheet P at the punching position has the shifting mechanisms 40 and 54 for momentarily holding the sheet P stationary. However, it is possible to feed sheet P continuously at a uniform speed with a DC motor and operate the piezo- electric element 80 upon detection of the punching position. In this case, the position determination means is constituted by the sensor for detecting the feed position of the sheet P and DC motor.

In this way, the two punched holes are formed accurately with the distance T1 from the sheet edge and distance S1 between their centers if the positional relation of the sensor AS and punching positions AP1 and AP2 is set as noted above. The distance T1 of the punched holes from the sheet edge may be adjusted by adjusting the mounting position of the sensor AS.

After the punching operation, the sheet P is further fed, and when the trailing end thereof passes by the sensor Z, the sensor Z provides a detection signal. The controller 102 thus provides a driving discontinuation signal to the drive circuit 104 to stop the motor 32 and cause the sheet P to be discharged onto the sheet tray 16, thus completing the punching process for one sheet.

During the above process cycle, the controller 102 receiving the falling signal from the sensor E provides a signal for starting the next sheet feed cycle to the APF 12, i.e., instructs the supply of the next sheet from the cassette 14 to the punch 10 for performing the next process cycle. If there is no sheet in the cassette 14, the APF is not started, thus bringing an end to the whole operation.

In the above embodiment, the type (A) punching is effected in the trailing end portion of sheet P. However, it is possible to effect the punching in the leading end portion of sheet P if the sensor AS is disposed on the lefthand side of the punching positions AP1 and AP2 in FIG. 1.

Now, the case of subjecting sheet P to the type (B) punching will be described with reference to the time chart of FIG. 11.

Like the case of the type (A), when the sheet entry sensor E detects the leading end of a sheet P, its state is changed from "off" to "on" to provide a rising signal, and the controller 102 provides a feed operation stop instruction to the APF 12. At the same time, the controller 102 provides a driving signal to the drive circuits 104 and 105 to turn on the motor 32 and solenoid 42, and thus sheet feed in the punch 10 is executed.

When the leading end of the sheet P reaches the sensor BS1, the sensor BS1 turns "off" to provide a falling detection signal. As a result, the controller 102 provides a driving discontinuation signal and a driving signal respectively to the drive circuits 105 and 106, thus momentarily switching the solenoid 56 from the "off" state to the "on" state and also the solenoid 42 from the "on" state to the "off" state. The stop position of the sheet P is thus determined. At the same time, the controller 102 provides a driving signal to the drive circuit 108. As a result, a drive voltage is applied to the piezoelectric element 80 of the punch unit 64 at the punching position BP. In this way, a first punched hole is formed in the sheet P at a position thereof at the distance of T2 from the side edge of the sheet and at the distance of T4 from the leading end of the sheet.

Subsequently, the sheet P is further fed, and when the first punched hole reaches the sensor BS2, the sensor BS2 is switched from the "off" state to the "on" state to provide a detection signal. Thus, as in the previous case the solenoids 42 and 56 are operated momentarily to determine the stop position of the sheet P, and punching is effected in the punching position BP to form the second punched hole. This second punched hole is formed at a position at the distance T2 from the side edge of the sheet P and the distance of S2 from the first punched hole.

In the above way, two punched holes are formed in the sheet P. Subsequently, the sheet P is further fed. When the trailing end of the sheet passes by the sensor Z, a detection signal is produced to stop the feed system drive motor 32 and discharge the sheet P onto the sheet tray 16, thus completing the punching of one sheet.

The instructions such as the next sheet supply request to the APF 12 are the same as in the case of the type (A).

Further, the positions of the punched holes and inter-hole distance can be adjusted by adjusting the mounting positions of the sensors BS1 and BS1.

In the case of the type (A) no time chart is shown, but the operation will be readily understood from the description concerning the type (B).

Now, the operation when subjecting sheet P to the type (C) punching will be described. In this case, the detection of the leading and trailing ends of the sheet by the sensors E and Z and operations based on the detections are entirely the same. When the sensor CS detects the leading end of sheet P, it provides a detection signal, and the controller 102 provides a driving signal to the drive circuit 109. As a result, a drive voltage is applied to the piezoelectric element 80 of the punch unit 64 at the punching position CP, and first punching is effected at the position CP. That is, a punched hole is formed at a position at a distance T3 from the leading edge of the sheet P and at a distance T5 from the side edge of the sheet. Like the cases of the types (A) and (B), at the time of punching, the sheet P is positioned by being momentarily held stationary with operation of the solenoids 42 and 56.

Subsequently, the sheet P is further fed, and when the first punched hole reaches the sensor SC, the sensor SC provides a detection signal again to form a second punched hole in the sheet P in the above manner. This second punched hole is formed at a position at distance T5 from the side edge of the sheet and at a distance S3 from the first punched hole. The distance S3 is the same as the distance T3.

In the above way, the following third and other holes are formed successively in a line in the range of the sheet length with the same intervals S3 and T3. When the trailing end of the sheet P is detected by the sensor Z, the punching of one sheet is completed.

Again in this case, the positions of the punched holes and inter-hole distance can be adjusted by adjusting the mounting position of the sensor CS.

Although no time chart is provided for the type (C), the operation will be readily understood from the description concerning the type (B).

In this embodiment, the position determination means consists of sensors for detecting the ends of the sheet in the feeding direction thereof and a shifting mechanism co-operating with these sensors. Where the sheet feed system drive motor is a pulse motor, the punching position may be determined without use of any sensor but through motor control by counting pulses or the like corresponding to the movement of a sheet from a reference position to a predetermined punching position. Where a servo motor is used, the punching position of a sheet P may be determined through motor control with a predetermined punching position with respect to a reference position as a goal value. Further, while in this embodiment sheet P is momentarily held stationary at the time of the determination of the punching position by the position determination means, with adaptation of the structures shown in FIGS. 8 and 9 the feed roller mechanism 30 can be operated continuously using an inexpensive DC motor, and no complicated control is necessary. Further, where a sheet is not momentarily held stationary at the time of the position determination but is fed continuously while operating the punching means simultaneously with the position determination, the structure shown in FIG. 9, using a piezoelectric element, is particularly suited. This structure permits obtaining a high response speed of the punching member and punches the sheet instant by, and it does not substantially adversely affect the sheet feed or the quality of the punched holes.

As shown above, the punch according to the present invention utilizes as the punching member operation drive source a dimensional strain of the electrical-to-mechanical conversion element based on the piezoelectric or magneto-striction effect, and thus a far higher response speed can be obtained compared to the case of mechanical means using a cam or the like or the case where a solenoid is used. Thus, the punch is sufficiently effective for punching continuously fed sheets and also can suitably be used with such sheet processing apparatuses as APF or PPC, for which a processing speed increase has been demanded. Further, since an enlarging mechanism is used to enlarge the dimensional strain of the electrical-to-mechanical conversion element so as to transmit the enlarged dimensional strain to the punching member, it is possible to use a small and inexpensive conversion element, thus readily permitting the size and cost reduction of the punch.

FIGS. 12 to 15 show more detailed specific examples of the position determination unit described before in connection with FIG. 8. The structure shown in FIG. 12 will first be described.

Figure 12:
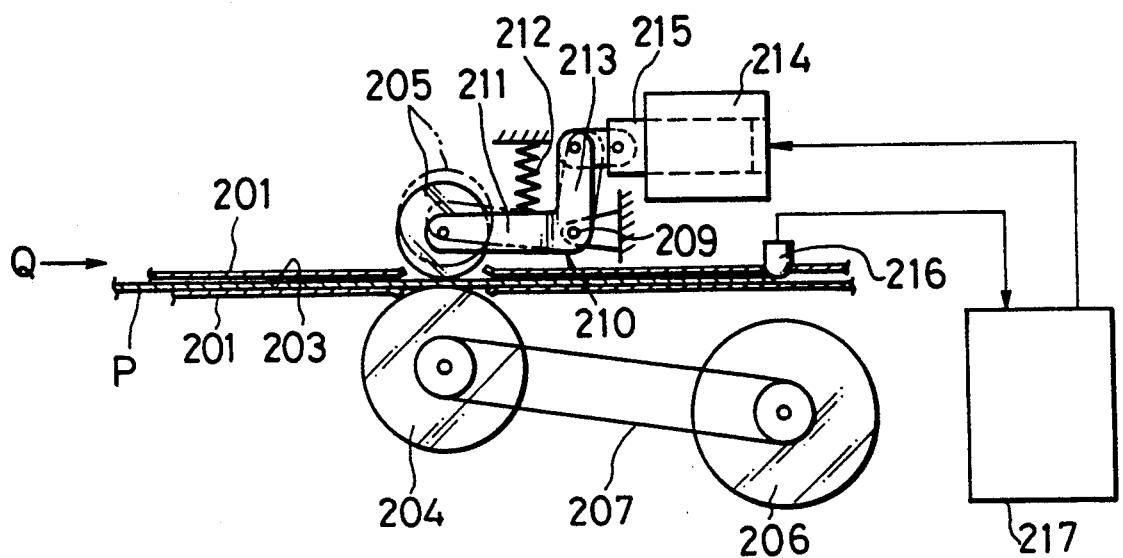
FIG. 12 is a more detailed structural view showing a positioning unit including a shifting mechanism using a solenoid like that shown in FIG. 8.

Designated at 201 in FIG. 12 is a pair of, i.e., upper and lower, guide members defining a space therebetween. Through this space, a sheet-like member P such as a card or a printing or copying paper sheet is guided in contact with the guide surface 203 of the lower guide member 201.

Designated at 204 is a drive roller, and at 205 is a pinch roller. At an intermediate position of the guide members 201 the drive and pinch rollers 204 and 205 oppose each other respectively on the lower and upper sides of the sheet-like member P.

The drive roller 204 is driven for rotation by a drive motor 206 which may be a DC motor or the like. Designated at 207 is a belt for transmitting the rotation of the drive motor 206 to the drive roller 204.

The pinch roller 205 is rotatably supported at the free end of one arm 211 of an L-shaped arm member 210 rotatably supported by a support 209. The arm 211 is spring biased by a compression spring member 212 in the counterclockwise direction in FIG. 12 to urge the sheet-like member P against the drive roller 204.

The sheet P urged in this way, i.e., pinched between the drive and pinch rollers 204 and 205, is fed along the guide members 201 in the direction of arrow Q, for instance.

A plunger 215 of a solenoid 214 is operationally coupled to the free end of the other arm 213 of the arm member 210. When the plunger 215 is retracted with an operation of the solenoid 214, the arm member 210 is turned in the clockwise direction as shown by phantom lines against the force of the compression spring member 212, thus shifting the pinch roller 205 away from the drive roller 204. This constitutes roller shifting means.

In the shifted state of the pinch roller 205, the sheet-like member P is in contact with the sole drive roller 204, and the frictional force between the sheet-like member P and the drive roller 204 is very slight compared to the frictional force between the sheet-like member P and the guide members 201.

Thus, when the pinch roller 205 is separated from the drive roller 204, and hence from the sheet-like member P, to release its urging force having been applied to the sheet-like member P, the running of the sheet-like member P is restricted on the basis of the difference between the frictional force between the sheet-like member P and the guide members 201 and the frictional force between the sheet-like member P and the drive roller 204, and thus the sheet-like member P is stopped.

Designated at 216 is a sensor for detecting the feed position of the sheet-like member P. The sensor is mounted on guide member 201, and in this structure it detects the leading end of the sheet-like member P.

Designated at 217 is a control circuit. According to a detection output of the sensor 216 the control circuit operates the solenoid 214 to cause shifting of the pinch roller 205.

In the shifted state of the pinch roller 205, the drive motor 206 may be continually driven or stopped. When stopping the drive motor 206, the solenoid 214 is operated according to the detection output noted above.

With the above structure, in which roller shifting is provided to shift the pinch roller 205 away from the drive roller 204 according to the detection output of the sensor 216 while the frictional force between the sheet-like member P and the guide members 201 is adapted to become greater than the frictional force between the sheet-like member P and the drive roller 204 to stop the sheet-like member P in the shifted state of the pinch roller 205. Thus, there is no need of paying any consideration of the inertial rotation of the drive motor 206 when stopped. This means that no motor control is necessary, and thus no complicated structure or control circuit is needed, and a satisfactory determination of the feed position of the sheet-like member P can be obtained.

Figure 13:
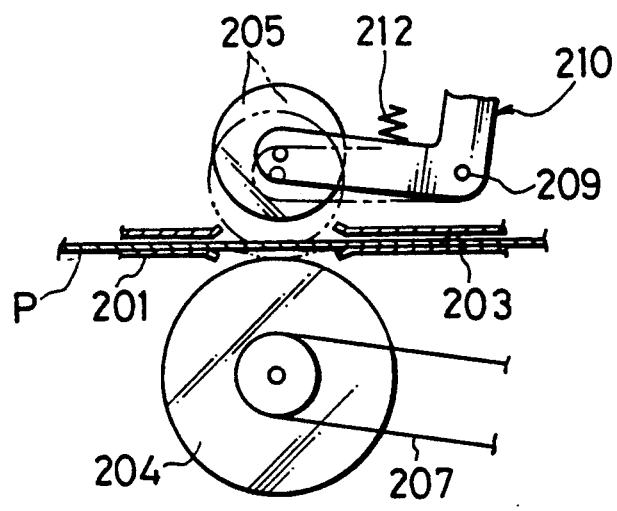
FIG. 13 is a structural view showing a modification of the FIG. 12 structure.

FIG. 13 shows a modification of the structure shown in FIG. 12. In FIG. 13, parts like those in FIG. 12 are designated by like reference numerals and symbols.

In this modification structure, the drive roller 204 is at a position out of contact with the sheet-like member P when the pinch roller 205 is in the shifted position as shown by solid lines in the Figure.

More specifically, the rotational peripheral surface of the drive roller 204 is found below the guide surface 203 of the guide member 201, and the pinch roller 205 is urged against the drive roller 204 by causing slightly bending or sagging of the sheet-like member P as shown by phantom lines.

With this structure, in the shifted or separated state of the pinch roller 205 there is no frictional force between the sheet-like member P and the drive roller 204, and the frictional force between the sheet-like member P and the guide member 201 is wholly effective to stop the sheet-like member P.

Figure 14:
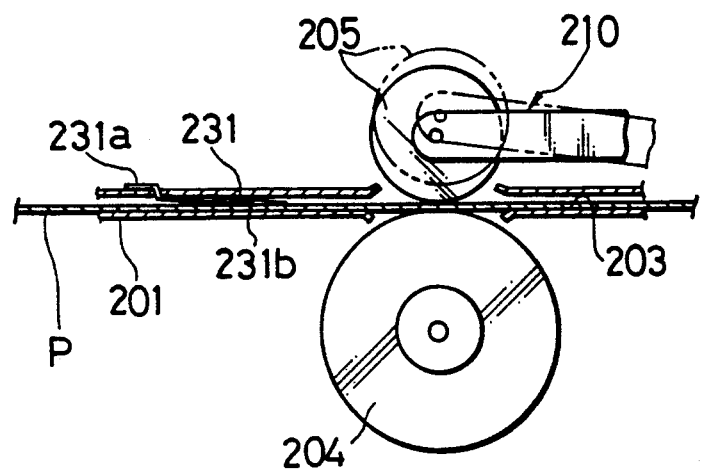
FIG. 14 is a structural view showing a further modification of the FIG. 12 structure provided with a friction provision member.

FIG. 14 shows a different modification of the structure of FIG. 12. In FIG. 14, parts like those in FIG. 12 are again designated by like reference numerals and symbols.

In FIG. 14, designated at 231 is a leaf spring member which constitutes friction provision means. The member is disposed between the guide members 201 as shown. Its stem 231a is coupled to the upper guide member 201, and its free end 231b is always in forced contact with the sheet-like member P while the sheet-like member is running, thus offering a predetermined running resistance to the sheet-like member P. Thus, a frictional force is produced between the sheet-like member P and the leaf spring member 231, and the sheet-like member P is urged against the guide surface 203 of the lower guide member 201, thus increasing the frictional force between the sheet-like member P and the guide member 201.

The urging force exerted against the sheet-like member P by the leaf spring member 231 and accompanying frictional forces between the sheet-like member P and the leaf spring member 231 and between the sheet-like member P and the guide member 201 are set such as not to hinder smooth feed of the sheet-like member P while the pinch roller 205 is operative as shown by solid lines in FIG. 14.

Figure 15:
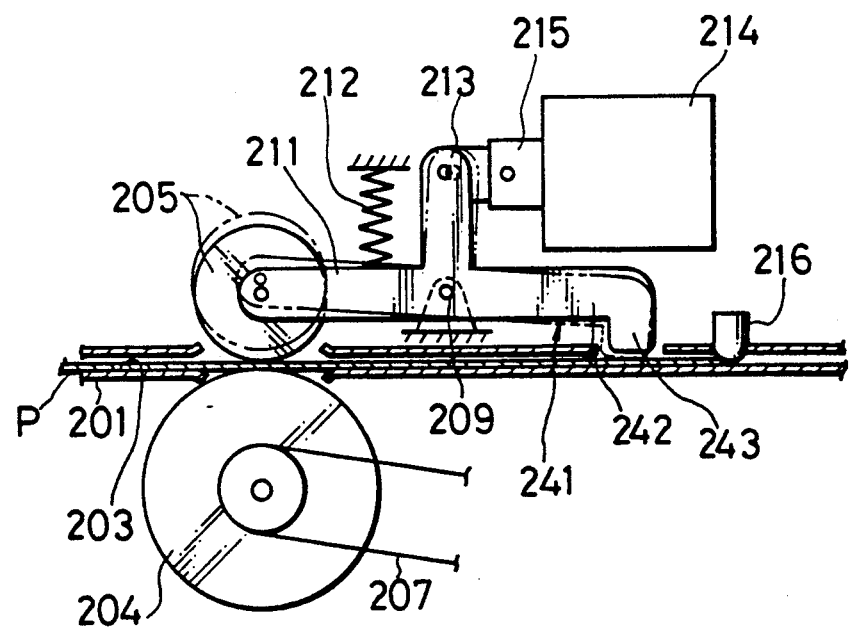
FIG. 15 is a structural view showing a further modification of the FIG. 12 structure provided with brake means.
Figure 16:
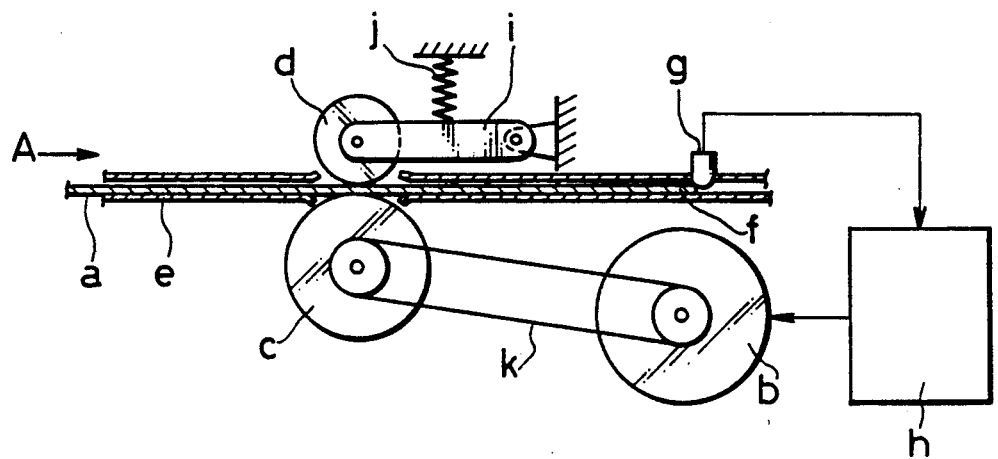
FIGS. 16 and 17 are schematic views showing prior art structures for sheet feed position determination.
Figure 17:
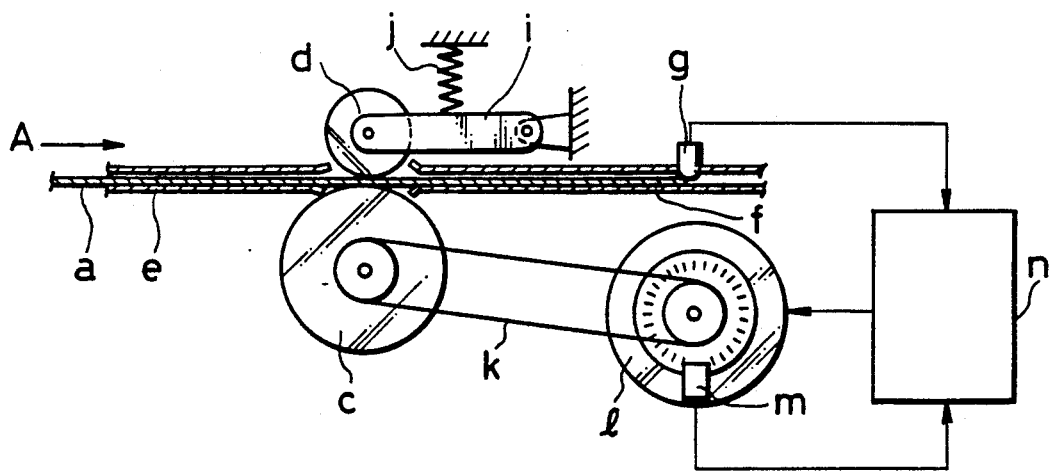

FIG. 15 shows a further modification of the structure of FIG. 12. Again in FIG. 14, parts like those in FIG. 12 are designated by like reference numerals and symbols.

In this modification structure, a T-shaped arm member 241 is used. Its arm 211 supports the pinch roller 205, while its oppositely extending arm 242 on the side of a pivotal support 209 opposite the arm 211 has an end provided with a brake portion 243. The brake portion 243 constitutes brake means such that with the arm 213 pulled in the clockwise direction by a plunger 215 of a solenoid 214 as shown by phantom lines in FIG. 15 it urges sheet-like member P against the guide surface 203 of the guide member 201. In this way, it restricts the running of the sheet-like member P in an interlocked relation to the shifting of the pinch roller 205.

Thus, the frictional force between the sheet-like member P and the guide member 201 is increased with the shifting of the pinch roller 205 without need of considerations of setting a magnitude of frictional force such as not to hinder smooth feed of the sheet-like member P when the pinch roller 205 is in an urging or operative state.

With the above modifications of FIGS. 13 to 15 it is possible to stop sheet-like member P more quickly and accurately at a predetermined feed position. Further, more enhanced effects can be expected by appropriately combining the structures shown in FIGS. 12 to 15. Further, the structure of FIG. 13 is effective where sheet-like member P is fed horizontally, i.e., where sheet-like member P is fed in a direction free from any gravitational force. With the other structures, sheet-like member P may be fed either horizontally or vertically. Particularly, the structures of FIGS. 14 and 15 are effective where sheet-like member P is fed vertically, i.e., in a direction identical with the direction of application of gravitational force.

Regarding the modification structures of the FIGS. 13 to 15, structure, function and effects like those of the structure of FIG. 12 are not described.

The above structure examples of the position determination unit for momentarily holding sheet-like member P stationary are by no means limitative and may be variously changed without departing from the scope of the invention.

As has been described in the foregoing, with the sheet-like member feed position determination unit according to the present invention the sheet-like member can be stopped quickly and accurately at a predetermined punching position without the need of stopping the drive motor but with a shifting operation of the pinch roller, i.e., with the difference between the frictional force between the sheet-like member and the guide member and frictional force between the sheet-like member and the drive roller. In addition, there is no need to consider inertial rotation of the drive motor accompanying the stopping thereof, hence no complicated structure or circuit is necessary, and satisfactory determination of the feed position of the sheet-like member can be readily obtained with a simple structure.

Further, with the structure shown in FIG. 13, which is effective where the sheet-like member is fed horizontally, and in which the drive roller is at a position out of contact with the sheet-like member in the shifted state of the pinch roller, and also with the structure shown in FIG. 14, which is provided with the friction provision means adapted to be in forced contact with the sheet-like member while the sheet-like member is running to offer a running resistance thereto, and further with the structure shown in FIG. 15, which is provided with brake means for braking the running of the sheet-like member by urging the same against the guide member in an interlocked relation to the shifting operation of the pinch roller, the sheet-like member can be stopped more quickly and accurately at a predetermined feed position to effect satisfactory sheet-like member feed position determination.

What is claimed is:

1. A punch connected to a machine such as an automatic paper feeder or a copying machine for receiving sheet-like members one by one, which are sent from said machine, and forming punched holes for filing in each sheet-like member at a predetermined punching position thereof, comprising:
   feeding means for feeding each received sheet-like member along a feed path, said feeding means including a feed roller mechanism and a DC motor driving said feed roller mechanism;
   position determination means for determining said predetermined punching position, at which each sheet-like member fed by said feeding means is punched, said position determination means including sensor means operative for detecting one of the leading and trailing ends of the sheet-like member in said feed path and providing an electrical detection signal;
   a punching member opposing said predetermined punching position and capable of executing a punching operation with a predetermined stroke to form punched holes for filing in the sheet-like member at said punching position thereof;
   first electrical-to-mechanical conversion element means for generating a predetermined amount of dimensional strain upon receipt of said electrical detection signal;
   first enlargement means for enlarging the dimensional strain generated in said first electrical-to-mechanical conversion element means and transmitting the enlarged dimensional strain to said punching member, thereby causing execution of the punching operation of said punching member with said predetermined stroke; and
   guide means defining said feed path and offering a predetermined feed resistance to the sheet-like member being fed along said feed path, wherein:
   said feed roller mechanism includes a drive roller and a driven roller, said feed roller mechanism being shiftable between an operative position, in which said driven roller is urged against the drive roller to feed said sheet-like member in a pinched state with a predetermined feeding force and an inoperative position, in which said driven roller is disengaged from the drive roller to provide substantially no feeding force to said sheet-like member, without stopping the driving of the DC motor;
   said position determination means further includes a shifting mechanism for shifting said driven roller from said operative position to said inoperative position temporarily in response to the operation of said sensor means to have said sheet-like member released from said feeding force and held stationary momentarily at said predetermined punching position; and
   said guide means includes a pair of substantially parallel guide plates defining said feed path therebetween, and includes a brake portion operable in response to the shift of said driven roller from said operative position to said inoperative position to urge the running sheet-like member against one of said guide plates, thereby braking the sheet-like member.

2. The punch according to claim 1, wherein:
   said shifting mechanism includes second electrical-to-mechanical conversion element means for generating a predetermined amount of dimensional strain and second enlargement means operatively coupled to said feed roller mechanism so as to enlarge a dimensional strain of said second electrical-to-mechanical conversion element means and transmit the enlarged dimensional strain to said feed roller mechanism, thereby causing the shift of said roller from said operative position to said inoperative position.

3. The punch according to claim 2, wherein:
said second electrical-to-mechanical conversion element means includes a piezoelectric element for generating a dimensional strain with a piezoelectric effect.

4. The punch according to claim 2, wherein:
said second electrical-to-mechanical conversion element means includes a magnetostriction element.

5. The punch according to claim 1, wherein:
said drive roller is disposed at a stationary non-contact position to be normally out of contact with the sheet-like member running along said feed path, said driven roller being operable, when said feed roller mechanism is in said operative position, to cause sagging of the sheet-like member and thereby urge the sheet-like member against said drive roller, and when said feed roller mechanism is in the inoperative position, said driven roller being shifted by said shifting mechanism to be separated from said drive roller to release the sheet-like member from contact with said drive roller, thereby stopping the sheet-like member.

6. The punch according to claim 1, wherein:
said guide means includes a friction provision member to be in contact with the sheet-like member during feeding thereof so as to offer a predetermined feed resistance.

7. A punch connected to a machine such as an automatic paper feeder or a copying machine for receiving sheet-like members one by one, which are sent from said machine, and forming punched holes for filing in each sheet-like member at a predetermined punching position thereof, comprising:
feeding means for feeding each received sheet-like member along a feed path, said feeding means including a feed roller mechanism and a DC motor driving said feed roller mechanism;
position determination means for determining said predetermined punching position, at which each sheet-like member fed by said feeding means is punched, said position determination means including sensor means operative for detecting one of the leading and trailing ends of the sheet-like member in said feed path and providing an electrical detection signal;
a punching member opposing said predetermined punching position and capable of executing a punching operation with a predetermined stroke to form punched holes for filing in the sheet-like member at said punching position thereof;
first electrical-to-mechanical conversion element means for generating a predetermined amount of dimensional strain upon receipt of said electrical detection signal;
first enlargement means for enlarging the dimensional strain generated in said first electrical-to-mechanical conversion element means and transmitting the enlarged dimensional strain to said punching member, thereby causing execution of the punching operation of said punching member with said predetermined stroke; and
guide means defining said feed path and offering a predetermined feed resistance to the sheet-like member being fed along said feed path, wherein:
said feed roller mechanism includes a drive roller and a driven roller, said feed roller mechanism being shiftable between an operative position, in which said driven roller is urged against the drive roller to feed said sheet-like member in a pinched state with a predetermined feeding force and an inoperative position, in which said driven roller is disengaged from the drive roller to provide substantially no feeding force to said sheet-like member;
said position determination means further includes a shifting mechanism for shifting said driven roller from said operative position to said inoperative position temporarily in response to the operation of said sensor means to have said sheet-like member released from said feeding force and held stationary momentarily at said predetermined punching position;
said drive roller is disposed at a stationary non-contact position to be normally out of contact with the sheet-like member running along said feed path, said driven roller being operable, when said feed roller mechanism is in said operative position, to cause sagging of the sheet-like member and thereby urge the sheet-like member against said drive roller, and when said feed roller mechanism is in the inoperative position, said driven roller being shifted by said shifting mechanism to be separated from said drive roller to release the sheet-like member from contact with said drive roller, thereby stopping the sheet-like member; and
said guide means includes a pair of substantially parallel guide plates defining said feed path therebetween, and includes a brake portion operable in response to the shift of said driven roller from said operative position to said inoperative position to urge the running sheet-like member against one of said guide plates, thereby braking the sheet-like member.

* * * * *